Oct. 28, 1958     C. W. BERKOBEN     2,858,092
AIRCRAFT BRAKE CONTROL APPARATUS
Filed May 24, 1952
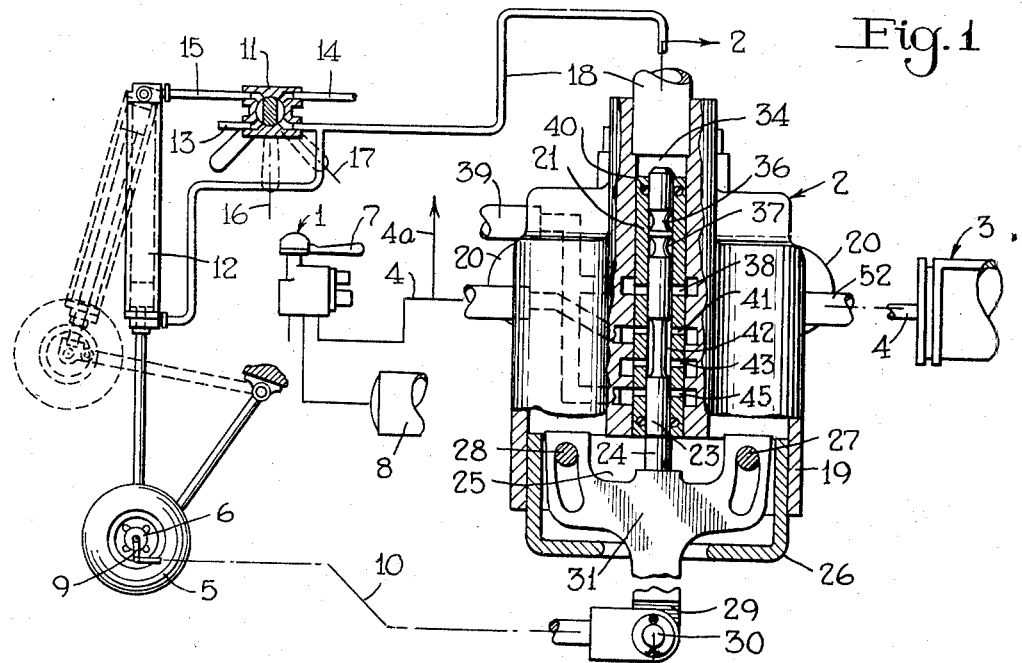
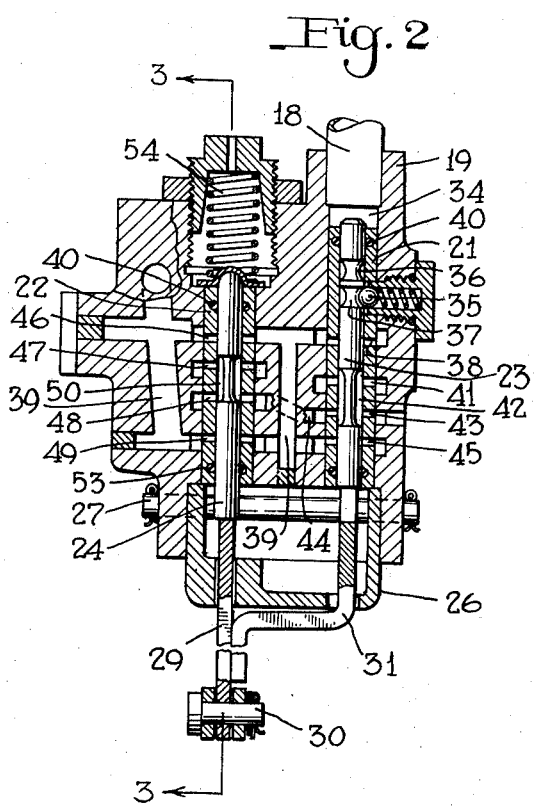
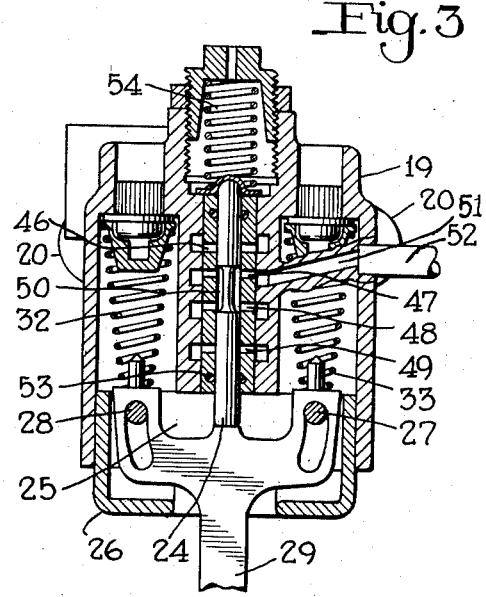
INVENTOR.
Charles W. Berkoben
BY
Adelbert A. Steinmiller
ATTORNEY United States Patent Office 2,858,092
Patented Oct. 28, 1958

2,858,092

AIRCRAFT BRAKE CONTROL APPARATUS

Charles W. Berkoben, Irwin, Pa., assignor to Westinghouse Air Brake Company, Wilmerding, Pa., a corporation of Pennsylvania Application May 24, 1952, Serial No. 289,929

16 Claims. (Cl. 244—111)

This invention relates to brake control apparatus of the type for braking the wheels of an aircraft when landing, and has particular reference to air brake control apparatus having means for preventing the application of brakes to the wheels of the airplane before the wheels touch the landing surface and are accelerated to substantially the landing speed of the plane.

When the wheels of an airplane are lowered into position just prior to the landing of the airplane they are usually stationary or may rotate very slowly until contact is made with the landing surface at which time they are accelerated almost instantaneously to the landing speed of the plane. The slippage of the wheels on the ground or landing surface during the interval of acceleration of the wheels to landing speed, causes rapid tire wear.

If the brakes are applied to the landing wheels of the airplane before the wheel tire treads contact the landing surface or before the wheels have been accelerated substantially to the landing speed of the plane following contact with the landing surface, the shock to the plane as well as the rate of tire wear is considerably increased. Premature application of the brakes on the wheels thus increases the likelihood of tire blowouts and consequent upset and damage to the plane as well as injury to occupants of the plane.

It is accordingly an object of my invention to provide an aircraft brake control apparatus embodying means to prevent the application of brakes to airplane wheels until the wheels have engaged the landing surface and have been accelerated to substantially the landing speed of the plane.

More specifically, it is an object of my invention to provide aircraft brake control apparatus having means which is automatically effective when the plane has begun its airborne flight to lock-out, that is to prevent, a brake application from becoming effective on the landing wheels even though initiated by the pilot of the plane and which is automatically effective to restore the brakes to the control of the pilot only after the wheels have engaged the landing surface and have been accelerated to substantially the landing speed of the plane.

It is a further object of my invention to provide an aircraft brake control apparatus of the type indicated in the foregoing object characterized by a lock-out valve device controlled jointly by fluid pressure, such as that normally employed to retract the landing wheels, and by the actuating force of a rotary inertia device responsive to the acceleration of the landing wheels.

Still another object of my invention is to provide an aircraft brake control apparatus of the type indicated in the foregoing objects, characterized by a combination brake release and lock-out valve device controlled by the same rotary inertia device responsive to acceleration and deceleration of the landing wheel for rendering the brake release and lock-out valve device effective to restore the control of the brakes to the operator only after the wheels have engaged the landing surface and have been accelerated to substantially the landing speed of the plane.

The above objects, and such other objects of my invention as will be made apparent hereinafter, are attained by means of an embodiment of my invention hereinafter to be described and shown in the accompanying drawings wherein:

Fig. 1 is a partial diagrammatic view of an aircraft brake control system embodying my invention, Fig. 2 is a sectional view, taken along the line 2—2 of Fig. 1, showing additional details of the control valve device therein and, Fig. 3 is a sectional view, taken along the line 3—3 of Fig. 2, showing still further details of the control valve device shown in Figs. 1 and 2.

Description

Referring to Fig. 1 of the single sheet of drawings accompanying this application, the equipment embodying my invention comprises a brake valve 1, a control valve 2 and a brake cylinder 3. The brake valve 1 is located in the pilot's compartment and is of the so-called self-lapping type. It serves to initiate, to regulate and to release the brake forces on the plane at the will of the pilot by controlling the supply of fluid under pressure to and the release of fluid under pressure from a straight-air pipe 4 that connects the brake valve and the brake cylinder and in which the control valve 2 is interposed. The brake cylinder 3 serves to effect an application of the brakes associated with a landing wheel 5 of the airplane. Fluid under pressure may be supplied to and released from other brake cylinders for other landing wheels, under the control of the brake valve 1, as through a branch pipe 4a of the pipe 4, a separate control valve 2 being interposed in each case between the brake valve 1 and the corresponding brake cylinder. Each control valve 2 is under the joint control of a wheel slip detector device 6, associated with the corresponding wheel, and fluid under pressure present only when the plane is in normal air-borne flight, referred to hereinafter as "flight condition," shown in this instance as the fluid under pressure in a system for retracting the landing gear. This control valve serves to control the flow of fluid under pressure in the straight-air pipe to the brake cylinder 3 such that when the plane takes flight, fluid under pressure in the straight-air pipe will be locked-out from the brake cylinder until the wheels again contact the landing surface and are accelerated to the landing speed of the plane.

Considering the parts of the equipment in greater detail, the brake valve 1 is of the self-lapping type described and claimed in Patent No. 2,042,112 to Ewing K. Lynn and Rankin J. Bush and since reference may be had to the patent it is deemed unnecessary, therefore, to describe it except functionally. When the operating handle 7 of the brake valve 1 is in its normal brake release position, the brake valve is conditioned to vent the straight-air pipe 4 to atmosphere. When the handle 7 is shifted horizontally into a so-called application zone out of its normal release position, the brake valve is conditioned to establish communication through which fluid under pressure is supplied from a reservoir 8 to the straight-air pipe 4, the brake valve 1 being automatically self-lapping to establish a pressure of fluid in the straight-air pipe 4 substantially proportioned to the degree of displacement of the operating handle out of its normal release position. Should the pressure of fluid in the straight-air pipe 4 tend to reduce, due to leakage or for other reasons made apparent hereinafter, from a pressure corresponding to the position of the operating handle, the brake valve is automatically operative to supply further fluid under pressure to the straight-air pipe to maintain a pressure of fluid therein corresponding to the position of the handle. The utility of this pressure-maintaining feature of the brake valve 1 will be made apparent hereinafter in connection with an application of the brakes after the wheels have been accelerated to substantially the landing speed of the plane and at time of reapplication of brakes following a slipping condition of the wheels.

The wheel slip detector device 6 associated with landing wheel 5 may be of the type disclosed in Patent No. 2,573,387, dated October 30, 1951, to Rankin J. Bush, said detector device being mounted as disclosed in said patent in the hub of the landing wheel 5. Essentially it comprises an inertia wheel driven by rotation of the landing wheel through a member (not shown) which is yieldingly displaced rotarily in one direction when the inertia wheel is accelerated above a fixed rate and yieldingly displaced rotarily in the opposite direction when the inertia weight is decelerated above a certain fixed rate. The member has an axially extending shaft to which a lever 9 is fixed, the lever 9 being effective through a rod or Bowden wire 10 to operate the control valve 2. The lever 9 and rod 10 are displaced from a normal position in one direction when the wheel 5 is accelerated above said fixed rate and is displaced in the opposite direction when said wheel is decelerated above the fixed rate.

The brake cylinder 3 is illustrated in the form of a conventional railway type brake cylinder, effective when supplied with fluid under pressure to establish braking forces on the wheel 5 according to the pressure of fluid supplied thereto. This brake cylinder will be considered as typifying any of the various forms of brake actuating devices used in airplane service, such as the expansible annular tube device shown in the above-mentioned Patent No. 2,573,387 or any of the various disc types of brake, any of which are effective to exert a braking force on the landing wheel according to the pressure of fluid supplied thereto.

The wheel retracting mechanism shown is rudimentary, providing a source of fluid under pressure present only when the plane is in air-borne flight for conditioning the control valve 2 to lock-out an application of the brakes before the plane lands as will be explained hereinafter. This retracting mechanism comprises a control valve 11, a hydraulically operated retracting cylinder 12, a hydraulic pressure supply pipe 13 and a sump pipe 14. The control valve 11 has an operating handle whereby to position the valve in any one of three positions, namely a first position corresponding to the position of the handle in solid lines in which fluid under pressure from the supply pipe 13 is connected to pipe 15 and to the cylinder for lowering the landing gear, a central position corresponding to that of the handle at line 16 for locking the cylinder, and a third position corresponding to that of the handle at line 17 for connecting hydraulic fluid under pressure to pipe 18 for retracting the landing gear and for control of the control valve 2 as will be explained hereinafter.

The control valve 2, shown in various sectional views in Figs. 1, 2 and 3 constitutes one of the features on my invention, and comprises a casing 19 adapted to be attached to a portion of the landing gear by securing lugs 20 shown in Figs. 1 and 3. The casing 19 is provided with two parallel bores in which are located valve bushings 21 and 22 for the cylindrical slide valves 23 and 24.

Valves 23 and 24 extend into a chamber 25 formed within a cover 26 attached to one end of the casing. Cover 26 is secured to the casing by two parallel spaced pins 27 and 28 which also serve as mounting pins for a T-shaped operating lever 29, the free end of which is pivotally secured to one end of the flexible shaft 10 by a pin 30. The crossarms of the lever 29 are provided with suitable slots near the ends of the arms through which pins 27 and 28 respectively extend such that the lever can pivot about either pin and shift the valves 23 and 24 within the bushings. The lever 29 is arranged to operate valve 24. A fork 31 secured to lever 29 has a T-shaped crossarm design similar to the crossarm of lever 29 and in parallel spaced relation thereto, which is also pivoted on pins 27 and 28 whereby said fork is arranged to force valve 23 into its bushing when lever 29 is displaced from its normal central position. Lever 29 and fork 31 are maintained normally in a normal central position in which the ends of the crossarms of both the lever and the fork rest against pins 27 and 28, by two springs 32 and 33 which bear one end against the casing 19 and the other end against the crossarm of lever 29. Springs 32 and 33 may each bear against its respective end of the crossarm with equal force or with different forces depending upon the service demanded.

Valve 23 can be identified as an application lock-out valve, the purpose of which is to automatically lock-out an application of the brakes to the landing wheels 5 when the plane takes to flight and to hold off any application of brake force to said wheels until they engage the runway when landing.

Valve 24 can be designated the wheel slip control valve, the purpose of which is to cut off communication from the brake valve to the brake cylinder and to connect the brake cylinder to an atmospheric exhaust when and while the wheel is being either retarded or accelerated above certain given rates.

Both valves 23 and 24 cooperate when landing to hold-off a brake application until the wheel is accelerated to approximately the landing speed of the plane by the lock-out valve locking out the application of brakes until the wheel engages the runway and the wheel slip control valve holding off the application of brakes while the wheel is being accelerated.

The application lock-out valve 23 is subject at one end to the action of lever 29 and at its other end to the pressure of hydraulic fluid in a chamber 34 connected to pipe 18, which pressure is ample, when retracting the landing gear, to shift said valve in the direction of the fork 31. Valve 23 may be yieldingly retained in one of two positions by a spring weighted ball 35 adapted to engage one of the two annular grooves 36 and 37 in the valve. Spaced apart in the bushing 21 for valve 23 are groups of radially drilled ports leading to the valve chamber of valve 23. The group of radially drilled ports 38 are connected direct to an atmospheric passageway 39. Ports 38 and the atmospheric passageway 39 prevent any buildup of fluid pressure on the sealing ring 40 thereby eliminating any possibility of leakage of air under pressure to the hydraulic fluid pressure line 18.

A group of radially drilled ports 41 in bushing 21 register with a passage in the casing 19 to which straight air pipe 4 is connected and when valve 23 is in its extreme position toward the chamber 34 they register with an annular valve chamber 42 formed in valve 23.

A group of radially drilled ports 43 in bushing 21 register with chamber 42 and with a passageway 44 leading to the valve bushing 22.

A group of radially drilled ports 45 in bushing 21 register with chamber 42 in the extreme position of valve 22 in the direction of chamber 25 and with the atmospheric port 39 to enable an atmospheric communication for the brake cylinder while the wheels are retracted and until they engage the runway when landing.

Bushing 22 for valve 24 contains four groups of radially drilled ports 46, 47, 48, 49. Ports 46 register with the atmospheric passageway of 39 in the casing 19 and with an annular chamber 50 formed in valve 24 when said valve is in its upper position as will be described later during wheel acceleration or deceleration above certain fixed rates. Ports 47 register with passageway 51 in the casing 19 which passageway communicates with the brake cylinder by way of pipe 52 as is shown in Figs. 1 and 3. Ports 47 also register at all times with an annular chamber 50 in the valve 24. Ports 48 register with passageway 44 in the casing 19 leading to ports 43 in valve bushing 21 and when valve 24 is in its lower position as when wheel 5 is not being accelerated above certain rates, ports 48 register with chamber 50. Ports 49 register at all times with the atmospheric passageway 39 and thereby prevent fluid pressure being established on a sealing ring 53.

From the above description of valve device 2, it will be seen that this device comprises two piston valves which may be positioned to provide a communication via passageways, ports and chambers 4, 41, 42, 43, 44, 48, 50, 47, 51 and 52 from the straight-air pipe 4 to the brake cylinder and that either piston valve can be positioned to cut off communication to the brake cylinder and to connect the brake cylinder to the atmosphere.

*Operation*

Considering the airplane in a flight condition and that it is desired to retract the wheels, the handle of valve 11 is placed in the position indicated by the line 17. The upper end of cylinder 12 is connected by way of pipe 15 to the sump pipe 14 and the lower end of cylinder 12 is connected by way of pipe 18 to the source of hydraulic pressure in pipe 13. The hydraulic pressure connected to the lower end of the cylinder will retract the landing gear. The pressure in pipe 18 is also connected to chamber 34 in the valve device 2. The pressure of hydraulic fluid in chamber 34 will act on valve 23 causing it to move in the direction of chamber 25 until the end of the valve engages the fork 31. The spring-weighted ball 35 will have left the groove 37 and entered the groove 36 to hold the valve 23 in this lower position until the wheel is caused to accelerate above a predetermined rate by engagement with the runway when landing. With the valve 23 in its lower position, communication is established between ports 43 and 45 by the chamber 42 in the valve while ports 41 are cut off. Any fluid under pressure in the brake cylinder 3 is then returned to atmosphere by way of pipe 52, passage 51, chamber 50 to ports 48 then by way of passageway 44, chamber 42, ports 45 and through atmospheric passageway 39. This will prevent the establishment of any pressure in the brake cylinder by connecting the brake cylinder to atmosphere and by cutting off the straight-air pipe at ports 41.

When the airplane is landing and when the wheels 5 engage the runway, the wheel slip detector 6 is caused to operate the shaft 10 and levers 29 and 31 such as to move both valves 23 and 24 upwardly to their respective uppermost positions. The valve 23 will move against the yielding resistance of spring-weighted ball 35 until the ball engages in groove 37 to hold the valve 23 in the uppermost position until the landing wheels are again retracted. With the valve 23 in its upper position, the atmospheric ports 45 are cut off by the valve and pipe 4 and ports 41 are connected by way of chamber 42 to ports 43 and to passageway 44 leading to ports 48 in the wheel slip control valve 24. While the wheel is accelerating to the landing speed of the plane the lever 29 will be rocked out of its normal central position to maintain the valve 24 in its upper position in which ports 48 are cut off and the brake cylinder is connected through ports 47 and 46 to atmospheric passageway 39. It can now be seen that while the wheel is being accelerated that even though application lock-out valve is in its upper position connecting the pipe 4 by way of chamber 42 to the wheel slip control valve 24 that no fluid pressure can be supplied to the brake cylinder to effect a brake application on the wheel until the wheel slip control valve 24 returns to its normal or lower position. When the wheel has been accelerated to the landing speed of the plane, the acceleration rate of the wheel drops below the selected value, and the lever 29 under the action of springs 32 and 33 will return to its normal central position. The valve 24 under the action of spring 54 thus moves to its lower position connecting ports 48 to the brake cylinder ports 47, passageway 51 and pipe 52. If the operator has already operated brake valve 1 to establish fluid pressure in the straight-air pipe 4, such fluid pressure will be communicated to the brake cylinder 3, thus establishing a brake cylinder pressure equal to the straight-air pipe pressure, and effecting a corresponding degree of application of the brakes. If the operator delays operation of the brake valve 1 until after the above described communication is established, then the application of the brakes will not be initiated until such time.

If after the brakes have been applied, the braking force applied to the wheel exceeds the adhesion of the wheel to the runway, the wheel will then retard at a rate in excess of the possible retardation rate of the plane and the wheel slip detecting device 6 will operate the lever 9, shaft 10 and lever 29 out of their normal positions to again effect operation of the wheel slip valve 24 to its upper position in which the pressure from the straight-air pipe is cut off at ports 48 and brake cylinder pressure is released by way of chamber 50 to the atmosphere through ports 46 and passageway 39. The release of brake cylinder pressure will thus reduce the brake forces effective on the wheel 5 to permit the wheel to return to normal rotation. As the wheel changes from excessive retardation to excessive acceleration while returning to normal rotation the wheel slip device 6 will rock the lever 29 from one side to the other of its normal central position to again hold the valve 24 in its upper position to prevent the reapplication of brake forces to the wheel until the wheel has been accelerated to the full landing speed of the plane.

The lock-out valve 23 will remain in its upper position in which the ball 35 rides in grooves 37 until the plane takes flight and the wheels are again retracted, at which time the pressure of hydraulic fluid in chamber 34 will be effective on the valve 23 to move it to its lower position cutting off pressure from the straight-air pipe 4 at ports 41 and connecting the brake cylinder to the atmosphere by way of ports 47, 48, passageway 44, ports 43 and 45 and atmospheric port 39.

From the above description, it will be evident that while the wheels are retracted the pilot can operate the brake valve to initiate a brake application, but that the lock-out valve will prevent pressure from being supplied to the brake cylinder to cause actual application of the brakes until the landing wheels are extended and engage the runway, and that the wheel slip control valve will then withhold the application until the wheels have been accelerated to the landing speed of the plane. The rate of tire wear and possible danger of upset and damage to plane and occupants is thus minimized.

Having now described my invention, what I claim as new and desire to secure by Letters Patent, is:

1. In a fluid pressure brake system for an airplane landing wheel including pressure operated brakes and a pressure source, and adapted for use in an airplane having apparatus for retracting the landing wheel, in combination, means interconnecting the brakes and source and providing communications through which fluid under pressure may be supplied to effect application of the brakes and through which fluid under pressure may be released to effect a release of the brakes, said means including a valve unit controlling said communications and having a first valve setting which permits application of the brakes and a second valve setting which prevents application of the brakes, fluid pressure operated means operatively connected to the valve unit and wheel retracting apparatus and conditioned when the wheel is retracted to cause said valve unit to assume said second setting, and means operatively connected to the wheel and the valve unit and conditioned when the wheel of the airplane contacts the ground when landing to cause said valve unit to assume said first setting.

2. In a fluid pressure brake system for a retractable airplane landing wheel, in combination, pressure operated brake means for applying brake forces to the wheel, brake control and communication forming means including a valve unit having first and second settings for controlling supply and release respectively of fluid pressure to and from the brake means to effect application and release of said brake forces, means operative as an incident to retraction of the airplane wheel for causing said valve unit to assume said second setting, and a device operatively connected to the wheel and to the valve unit and responsive to a predetermined rate of acceleration of said wheel, as when landing, to cause said valve unit to assume said first setting.

3. In a fluid pressure brake system for a retractable airplane landing wheel including pressure operated brakes and a pressure source, in combination, communication forming means interconnecting the brakes and source, valve means associated with said communication forming means and controlling communications through which the supply of fluid under pressure is utilized to control said brakes, means operative in response to fluid pressure supplied for effecting retraction of said airplane landing wheel to cause said valve means to assume a first setting whereat the brakes cannot be applied, and inertia means operatively connected to the wheel and to the valve means and responsive to variation in the rate of change of rotative speed of said wheel upon contact with the ground upon landing to cause said valve means to assume a second setting permitting the supply of fluid under pressure to effect an application of said brakes.

4. In a fluid pressure brake system having a pressure supply and effective to apply, control and release brake force on an airplane landing wheel, and adapted for use in an airplane having apparatus for retracting the landing wheel, in combination, a rotary inertia device driven in accordance with rotation of the wheel, a first valve unit operatively connected to and controlled by said rotary inertia device for so controlling the brake forces effective on the wheel as to prevent locking thereof, and a second valve unit serially connected with said first valve unit, said second valve unit being operatively connected to the wheel retracting apparatus and responsive to retraction of the wheel for preventing the application of brake forces on the wheel, said second valve unit being also operatively connected to the inertia device and operated in response to operation of said inertia device at the time the wheel contacts the ground in landing to permit application of brake forces to the wheel.

5. In a fluid pressure brake system for an airplane landing wheel including a pressure operated brake and a pressure supply, and adapted for use in an airplane having apparatus for retracting the landing wheel, in combination, brake control means including communication forming means interconnecting the brake and pressure supply, said brake control means including a first valve unit and a second valve unit, said valve units serially controlling the communications in said brake control means through which fluid under pressure may be supplied to effect application of the brakes and from which fluid under pressure may be released to effect release of the brakes, means automatically conditioned upon retracting the wheel of the airplane for causing said first valve unit to assume a first predetermined valve setting releasing fluid under pressure, and a device operatively connected to both said valve units and said wheel and responsive to acceleration and deceleration of said wheel, effective when said wheel touches the ground upon landing, to cause operation of said first valve unit to assume a second predetermined valve setting permitting brake application, and also to control said second valve unit to permit delivery of fluid pressure for braking purposes.

6. In a fluid pressure brake system for an airplane landing wheel including a pressure operated brake and a pressure supply, and adapted for use in an airplane having apparatus for retracting the landing wheel, in combination, means interconnecting the brake and supply and providing communications through which fluid may be supplied or released to correspondingly effect application or release of brake forces on said landing wheel, a device responsive to acceleration of said landing wheel, a first valve unit and second valve unit both associated with said means, said valve units serially controlling said communications, and means operatively connected to said first valve unit and to the wheel retracting apparatus and automatically conditioned upon retraction of the wheel of the airplane for causing said first valve unit to assume a first predetermined setting preventing brake application, said first valve unit also being operatively connected to said device and responsive to operation of said device as it responds to acceleration of said landing wheel after the wheel contacts the ground when landing to cause said first valve unit to assume a second predetermined setting permitting brake application, said device also controlling said second valve unit to enable delivery of fluid pressure for braking purposes in such a manner as to prevent locking of the wheel.

7. In a brake system for an airplane having at least one retractable landing wheel, the combination of fluid pressure operated brake means including communication forming means for applying brake forces to said wheel, a valve device associated with said brake means for controlling the communications through which fluid under pressure may be supplied to apply said brake forces, means for effecting the supply of fluid pressure to cause retraction of said wheel when the airplane is in aerial flight, means responsive to the fluid pressure supplied to cause retraction of said wheel for actuating said valve device to a first setting preventing brake application, and means connected to the valve device and operative upon engagement of the wheel with the ground when the airplane lands for causing said valve device to be actuated to a second setting permitting brake application.

8. In a brake system for an airplane having a landing wheel and fluid pressure operated brake means including communication forming means for braking the wheel, the combination of valve means associated with the brake means and controlling communications through which fluid under pressure may be supplied to the brake means to effect a brake application, fluid pressure responsive means operatively connected to the valve means for actuating said valve means to a first valve setting preventing brake application, and means connected to the wheel and to the valve means and responsive to acceleration of said wheel exceeding a certain rate occurring when the wheel contacts the ground on landing for actuating said valve means to a second valve setting permitting brake application.

9. In a brake system for an airplane having at least two retractable landing wheels, the combination of fluid pressure means for each of said wheels for applying brake forces thereto, conduit means for each of said fluid pressure means, a valve device for each of the conduit means for controlling communications through which fluid under pressure may be supplied to apply brake forces on the corresponding wheel, means for supplying fluid under pressure to effect retraction of said wheels when the airplane is in aerial flight, means responsive to the pressure of fluid supplied to effect retraction of said landing wheels for operating each of said valve devices to a first setting preventing brake application, and rotary inertia means for each wheel operatively connected to a corresponding valve device and responsive to acceleration of the wheel when the airplane is landing to operate the corresponding valve device to a second setting permitting brake application.

10. In a brake system for an airplane having at least two retractable landing wheels, the combination of fluid pressure means including communication forming means for each of said wheels for applying brake forces thereto, a valve device for each of the wheels associated with said fluid pressure means for controlling communications through which fluid under pressure may be supplied to apply said brake forces on the corresponding wheel, means for retracting said wheels when the airplane is in aerial flight, means operatively connected to the valve devices and responsive to operation of said landing wheel retracting means to retract the wheels for operating each of said valve devices to a first setting preventing brake application, and inertia means for each wheel operatively connected to each of said valve devices respectively and responsive to acceleration of the wheel when the airplane is landing to operate said valve device to a second setting permitting brake application.

11. In combination with a fluid pressure brake system for an airplane wheel and fluid pressure means for retracting said wheel when the airplane is in flight, first valve means, inertia responsive means associated with said wheel and responsive to abrupt changes in wheel speed for controlling said first valve means to release brake forces on said wheel, second valve means operatively connected to the fluid pressure retracting means and operative by fluid pressure to a first position in response to retracting said wheel for locking out an application of brakes, said second valve means being operatively connected to said inertia responsive means and operative to a second position by said inertia responsive means when the wheel contacts the ground when landing to permit application of the brakes, and means for maintaining said second valve means in either the second or first position thereof until succeeding operation of retracting the wheel or operation of the inertia responsive means upon contacting the ground.

12. In an airplane having a plurality of landing wheels, in combination, fluid pressure retracting means for retracting all said wheels when in flight, a plurality of fluid pressure brake means for braking said plurality of wheels respectively when landing, an operator's control device connected to said plurality of fluid pressure brake means for regulating the brake forces on all said wheels in unison, individual brake controlling means for each of said wheels adapted to render individual fluid pressure brake means inoperative during abrupt changes in rotative speed of individual wheels, and valve means for each wheel for locking out operation of said individual brake controlling means when the wheels are retracted.

13. A fluid pressure control valve device having an inlet port, a delivery port and an exhaust port, a first valve unit, a second valve unit, said first valve unit being biased to one position in which it establishes communication between said delivery port and a passageway, said second valve unit being yieldingly restrained in either one of two positions, fluid pressure responsive means for moving said second valve unit to one position in which it establishes communication between said passageway and said exhaust port, mechanical means operable to move both said valve units simultaneously to second positions respectively in which said first valve unit connects said delivery port to said exhaust port and in which said second valve unit connects said inlet port to said passageway, and means for operating said mechanical means so that said first valve unit is restored to its said one position while said second valve unit is restrained in its said second position, whereby communication is established by joint action of said first valve unit and said second valve unit between the said inlet and delivery ports.

14. A unitary valve device for controlling the supply of fluid under pressure to and the release of fluid under pressure from a device to be operated, said valve device comprising a casing having a supply passageway, a delivery passageway, an exhaust passageway, and an intermediate passageway, a first valve device, a second valve device, said first valve device having a first position in which it connects the said delivery passageway to said intermediate passageway and a second position in which it connects the said delivery passageway to said exhaust passageway, said second valve device having a first position in which it connects the supply passageway to said intermediate passageway and a second position in which it connects the said intermediate passageway to said exhaust passageway, means for restraining said second valve device in either its said first position or its said second position after it is operated thereto, fluid pressure responsive means for actuating said second valve device to its said second position, and actuating means common to both said first valve device and said second valve device for actuating said first and said second valve devices simultaneously to their said second position and said first position respectively, and biasing means for restoring said first valve device to its said first position while said second valve device remains in its said first position, said first valve device and said second valve device cooperating while in their respective first positions to establish communication from the said supply passageway via said intermediate passageway to said delivery passageway.

15. In a fluid pressure brake system for a retractable airplane landing wheel including a fluid pressure operated brake device and a fluid pressure supply, a first valve means and a second valve means jointly controlling communication between the brake device and the fluid pressure supply, said first valve means being operative to control the application and release of fluid to correspondingly permit braking and unbraking of said wheel, means responsive to acceleration of said wheel and connected to said first valve means for causing it to so control the fluid pressure supplied to said fluid pressure operated brake device as to prevent locking of the wheel, and means responsive to fluid pressure supplied to effect retraction of said airplane landing wheel for actuating said second valve means to prevent the supply of fluid pressure to said brake device to brake the wheel, said acceleration responsive means being also operatively connected to said second valve means and effective when the wheel touches the ground on landing to render said second valve means ineffective to prevent supply of fluid pressure to said brake device.

16. Fluid pressure brake control apparatus for a retractable landing wheel of an airplane having the usual operator's brake controlling device and the usual brake cylinder means, comprising in combination, inertia responsive wheel slip detecting means, brake control means responsive to said detecting means, valve means effective in a first position thereof for rendering the brake control means ineffective and operative to a second position in response to operation of said inertia responsive wheel slip detecting means upon touchdown of said landing wheel for rendering said brake control means effective, fluid pressure means responsive to the pressure of fluid supplied thereto for retracting said landing wheel, and means responsive to the fluid pressure supplied to said fluid pressure means for operating said valve means to its said first position.

References Cited in the file of this patent

UNITED STATES PATENTS

| | | |
|---|---|---|
| 896,120 | Kramer | Aug. 18, 1908 |
| 1,836,740 | Albers | Dec. 15, 1931 |
| 1,887,583 | Down | Nov. 15, 1932 |
| 2,107,823 | Hallot | Feb. 8, 1938 |
| 2,200,416 | Daniels | May 14, 1940 |
| 2,491,812 | Hoffacker | Dec. 20, 1949 |
| 2,515,229 | Jenkins | July 18, 1950 |
| 2,515,729 | Morrison | July 18, 1950 |
| 2,573,387 | Bush | Oct. 30, 1951 |
| 2,692,100 | Trevaskis | Oct. 19, 1954 |

FOREIGN PATENTS

| | | |
|---|---|---|
| 576,039 | Great Britain | Mar. 15, 1946 |

OTHER REFERENCES

Exhibit: Photograph C–45319 of "Pneumatic Control Equipment," class 188–181.